US010430871B2

(12) United States Patent
McBride (10) Patent No.: US 10,430,871 B2
(45) Date of Patent: Oct. 1, 2019

(54) SELF-SERVICE TERMINAL (75) Inventor: Michael McBride, Carnoustie Angus (GB)

(73) Assignee: NCR Corporation, Atlanta, GA (US)

( * ) Notice: Subject to any disclaimer, the term of this patent is extended or adjusted under 35 U.S.C. 154(b) by 990 days.

(21) Appl. No.: 12/784,598

(22) Filed: May 21, 2010

(65) Prior Publication Data
US 2011/0288997 A1 Nov. 24, 2011

(51) Int. Cl.
*G06Q 40/00* (2012.01)
*G06F 3/0488* (2013.01)
*G06Q 20/10* (2012.01)
*G06Q 20/40* (2012.01)

(52) U.S. Cl.
CPC ......... *G06Q 40/00* (2013.01); *G06F 3/04883* (2013.01); *G06Q 20/10* (2013.01); *G06Q 20/40* (2013.01)

(58) Field of Classification Search
CPC ............. G06Q 20/409; G06Q 20/4093; G06Q 20/4097; G06Q 40/00; G06Q 20/10; G06Q 20/40; G06F 3/04883
USPC .................................................. 705/44; 1/44
See application file for complete search history.

(56) References Cited

U.S. PATENT DOCUMENTS

| | | | | |
|---|---|---|---|---|
| 5,594,810 A * | 1/1997 | Gourdol | ......................... | 382/187 |
| 5,956,691 A * | 9/1999 | Powers | ................... | G06Q 40/06 |
| | | | | 705/4 |
| 7,394,346 B2 * | 7/2008 | Bodin | .......................... | 340/5.51 |
| 7,469,825 B2 * | 12/2008 | Clark et al. | .................... | 235/383 |
| 8,073,714 B1 * | 12/2011 | Ball | ........................ | G06Q 10/10 |
| | | | | 705/35 |
| 2002/0074394 A1 * | 6/2002 | Birnie | ........................... | 235/379 |
| 2002/0109677 A1 * | 8/2002 | Taylor | .................... | G06F 3/0233 |
| | | | | 345/173 |
| 2002/0139842 A1 * | 10/2002 | Swaine | .......................... | 235/379 |
| 2002/0196238 A1 * | 12/2002 | Tsukada et al. | ............... | 345/173 |
| 2003/0132974 A1 * | 7/2003 | Bodin | ...................... | G06F 3/017 |
| | | | | 715/863 |
| 2004/0066422 A1 * | 4/2004 | Chandane | ........... | G06F 3/04886 |
| | | | | 715/865 |
| 2004/0217163 A1 * | 11/2004 | Savage | .......................... | 235/380 |
| 2004/0234110 A1 * | 11/2004 | Chou | ............................. | 382/122 |
| 2006/0000886 A1 * | 1/2006 | Clark et al. | .................... | 235/379 |

(Continued)

OTHER PUBLICATIONS

Dileep Kumar, Yeonseung Ryu, Dongseop Kwon, "A survey on biometric fingerprints: The cardless payment system", Apr. 23-24, 2008, IEEE (Year: 2008).*

(Continued)

*Primary Examiner* — Eric T Wong
*Assistant Examiner* — Kevin T Poe
(74) *Attorney, Agent, or Firm* — Schwegman, Lundberg & Woessner (57) ABSTRACT

A method of executing a transaction for a user at a self-service terminal is described. The method comprises: (a) sensing a stroke gesture delineated by the user on a touch-sensitive panel; (b) recognizing the delineated stroke gesture; and (c) matching the delineated stroke gesture to one of a plurality of defined transaction strokes, each defined transaction stroke being associated with a specific transaction. The method further comprises (d) executing the specific transaction associated with the matched transaction stroke.

19 Claims, 5 Drawing Sheets

| TRANSACTION CODE | TRANSACTION DESCRIPTION |
|---|---|
| Dx | DISPENSE $X (WHERE X IS IN RANGE 10 TO 300) |
| DEx | DEPOSIT $X (WHERE X IS IN RANGE 10 TO 300) |
| DRx | DISPENSE $X AND PRINT A RECEIPT |
| DCx | DEPOSIT CHEQUES TO VALUE OF $X |
| SP | PRINT A STATEMENT OF RECENT TRANSACTIONS |
| B | DISPLAY ACCOUNT BALANCE ON SCREEN |

(56) References Cited

U.S. PATENT DOCUMENTS

| | | | | |
|---|---|---|---|---|
| 2006/0020798 | A1* | 1/2006 | Lai | H04L 63/0823 |
| | | | | 713/170 |
| 2006/0217985 | A1* | 9/2006 | Noguchi | G06F 21/31 |
| | | | | 704/270 |
| 2007/0075968 | A1* | 4/2007 | Hall et al. | 345/157 |
| 2008/0120129 | A1* | 5/2008 | Seubert | G06Q 10/06 |
| | | | | 705/35 |
| 2008/0249883 | A1* | 10/2008 | Daily | 705/23 |
| 2009/0278807 | A1* | 11/2009 | Hu | G06F 21/31 |
| | | | | 345/173 |

OTHER PUBLICATIONS

Sjoberg Samuel, "A Touch Screen Interface for Point-of-Sale Applications in Retail Stores", 2005, semanticscholar.org (Year: 2005).*
"Atsushi Sugiura, Yoshiyuki Koseki, A User Interface Using Fingerprint Recognition Holding Commands and Data Objects on Fingers", 1998, http://citeseerx.ist.psu.edu/viewdoc/download?doi=10.1.1.37.1758&rep=rep1&type=pdf (Year: 1998).*

* cited by examiner

| TRANSACTION CODE | TRANSACTION DESCRIPTION |
|---|---|
| Dx | DISPENSE $X (WHERE X IS IN RANGE 10 TO 300) |
| DEx | DEPOSIT $X (WHERE X IS IN RANGE 10 TO 300) |
| DRx | DISPENSE $X AND PRINT A RECEIPT |
| DCx | DEPOSIT CHEQUES TO VALUE OF $X |
| SP | PRINT A STATEMENT OF RECENT TRANSACTIONS |
| B | DISPLAY ACCOUNT BALANCE ON SCREEN |

SELF-SERVICE TERMINAL

FIELD OF INVENTION

The present invention relates to improvements in, or relating to, a self-service terminal (SST).

BACKGROUND OF INVENTION

SSTs are public access devices that provide goods and/or services to customers in an unattended environment and/or in an unassisted manner. One common type of SST is an Automated Teller Machine (ATM). An ATM provides a customer with a selection of transactions and gathers information from the customer to enable a desired transaction to be executed. This information gathering process may require the customer to navigate through multiple screens. However, some ATM customers have difficulty in navigating through ATM screens, perhaps due to visual, physical, or cognitive impairment; while other ATM customers would prefer a quicker way of executing a transaction at the ATM.

SUMMARY OF INVENTION

Accordingly, the invention generally provides methods, systems, apparatus, and software for allowing a user to execute a transaction at an SST by drawing a character on a touch-sensitive panel of the SST.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of executing a transaction for a user at a self-service terminal, the method comprising:

(a) sensing a stroke gesture delineated by the user on a touch-sensitive panel;

(b) recognizing the delineated stroke gesture;

(c) matching the delineated stroke gesture to one of a plurality of defined transaction strokes, each defined transaction stroke being associated with a specific transaction; and (d) executing the specific transaction associated with the matched transaction stroke.

The method may comprise the further steps of:

(c+1) informing the user of the specific transaction associated with the matched transaction stroke;

(c+2) requesting the user to confirm that the specific transaction associated with the matched transaction stroke is the transaction that the user would like to execute;

(c+3) executing step (d) only in response to detecting the user's confirmation that the specific transaction associated with the matched transaction stroke is the transaction that the user would like to execute.

If the user does not confirm that the specific transaction associated with the matched transaction stroke is the transaction that the user would like to execute, then the self-service terminal may provide a selection of transaction options from which the user may select a desired transaction.

Alternatively, the method may comprise the further steps of:

(c+1) informing the user of the specific transaction associated with the matched transaction stroke;

(c+2) informing the user that the specific transaction associated with the matched transaction stroke will be executed within a predefined time period unless the user cancels the transaction;

(c+3) executing step (d) when the predefined time period elapses without the user cancelling the transaction.

The predefined time period may comprise approximately three seconds, five seconds, ten seconds, or any other convenient time period.

The predefined time period may not be a fixed amount of time (such as a defined number of seconds), but rather it may be related to how long it takes the SST to prepare the transaction for execution. For example, for a banknote dispense transaction, the predefined time period may elapse when the transaction has been authorized and the banknotes are ready for presenting to the user.

The step of sensing a stroke gesture delineated by the user on a touch-sensitive panel may include converting the sensed stroke gesture to a sequence of points. Alternatively, the step of sensing a stroke gesture delineated by the user on a touch-sensitive panel may include performing optical character recognition on the stroke gesture.

The step of recognizing the delineated stroke gesture may include the sub-steps of converting the sequence of points to one or more characters.

The step of matching the delineated stroke gesture to one of a plurality of defined transaction strokes may include matching the one or more characters from the converted sequence of points to one or more characters in a list of transaction character entries (also referred to as defined transaction strokes), each transaction character entry in the list being (i) unique, and (ii) associated with a predefined transaction. Each transaction character entry may comprise one or more characters.

The transaction may comprise: a dispense transaction, a deposit transaction, a statement printing transaction, a funds transfer transaction, a combined dispense and receipt transaction, a combined deposit and receipt transaction, or the like.

According to a second aspect there is provided a computer program comprising instructions that, when executed on a processor, implement the steps of the method of the first aspect.

The computer program may be embodied on a carrier, stored in a computer memory, or conveyed on a propagating signal.

According to a third aspect there is provided a self-service terminal comprising:

a touch-sensitive panel operable to detect contact by a user as the user delineates a stroke gesture on the panel;

a stroke recognition engine arranged to (i) convert a sequence of points received from the touch-sensitive panel and corresponding to each stroke gesture delineated by the user to a character, (ii) match the converted characters to one of a plurality of transaction entries, each transaction entry being (a) unique, and (b) associated with a predefined transaction, and (iii) identify a specific transaction associated with the matched transaction entry; and a transaction execution component arranged to execute the specific transaction.

Each of the plurality of transaction entries may comprise one or more characters. For example, a dispense transaction entry may comprise the letters "DI" or just "D". A transaction entry may also include one or more numerals indicative of the amount of the transaction. For example, if a user delineates the characters "D50" on the touch-sensitive panel, then this may indicate that user is requesting a dispense transaction for the amount fifty dollars; similarly, "D100" would indicate that a one hundred dollar dispense transaction is requested; however, "DE100" would indicate that the user is requesting to deposit one hundred dollars.

Any type of currency or other valuable media may be used, for example, U.S. dollars, pound sterling, Japanese Yen, Euros, cheques, Giros, or the like.

The user may delineate a sequence of stroke gestures on the same portion of the touch-sensitive panel (that is, successive stroke gestures overlie each other) or each stroke gesture may be delineated on a different portion of the touch-sensitive panel (similar to writing a word on paper).

The transaction execution component may comprise a transaction application program executing on a controller in the self-service terminal.

The stroke recognition engine may include a conventional character recognition engine. Character recognition engines, which convert a stroke gesture input by a user into a character, are known. One type of character recognition engine is referred to as "Graffiti" and is disclosed in U.S. Pat. No. 5,596,656, which is hereby incorporated by reference. Other character recognition engines may be used, such as Quickwriting (described at http://mrl.nyu.edu/~perlin/doc/quikwriting/quikwriting.pdf).

Matching the converted characters to one of a plurality of transaction entries may be implemented by storing a table of transactions and corresponding characters (transaction strokes) identifying those transactions. In some embodiments, the function of matching one or more recognized characters to one of a plurality of predefined transactions may be implemented by a separate software component. For example, a transaction application may include a component that matches one or more recognized characters to one of a plurality of predefined transactions, then executes the matched transaction.

The self-service terminal may further comprise a token reader to identify the user. The token reader may be a card reader, a biometrics reader, a passbook reader, or the like.

The user may be a customer or a service user.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

According to a fourth aspect there is provided a self-service terminal comprising:

a touch-sensitive panel operable to detect contact by a user as the user delineates a stroke gesture on the panel;

a stroke recognition engine arranged to (i) store a sequence of points received from the touch-sensitive panel and corresponding to the stroke gesture delineated by the user thereon, (ii) match the sequence of points to one of a plurality of transaction strokes, and (iii) identify a predefined transaction associated with the matched transaction stroke; and a transaction program arranged to (i) receive the identified transaction from the stroke recognition engine, and (ii) execute the received transaction.

Each of the plurality of transaction strokes may correspond to one or more characters. For example, a dispense transaction stroke may correspond to the letter "D" or the letters "DI". A transaction stroke may also include a numeral indicative of the value of the transaction amount. For example, if a user delineates the characters "D50" on the touch-sensitive panel, then this may indicate that user is requesting a dispense transaction for the amount fifty dollars; similarly, "D100" would indicate that a one hundred dollar dispense transaction is requested.

The stroke recognition engine may comprise a distributed software architecture.

It will now be appreciated that these aspects have the advantage that a user at an SST (typically a customer, but in some cases a service user, such as a replenisher) can execute a transaction by writing one or more strokes on a touch-sensitive panel rather than having to navigate through a sequence of screens presented by the SST. The stroke gestures can be used in a more extensive way than just as a text input mechanism. The stroke gestures can function in a similar way to a macro (a single command that incorporates multiple sequential commands). This is because stroke gestures allow the user to select and execute a transaction directly, without having to navigate through a sequence of information-gathering screens.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
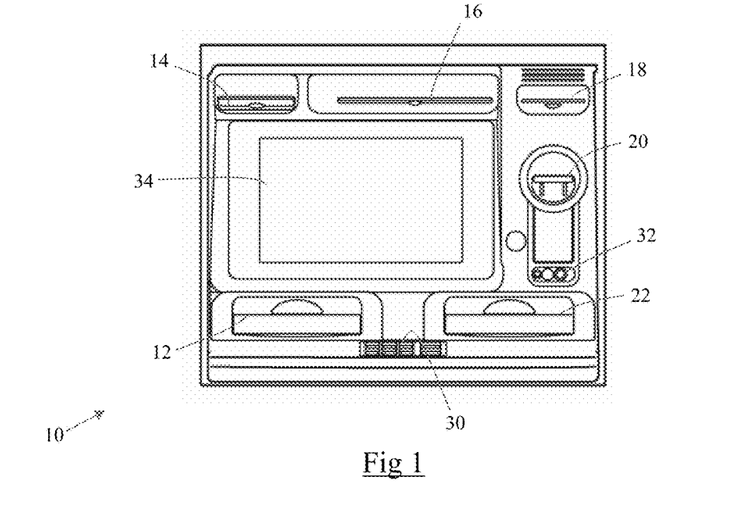
FIG. 1 is pictorial front view of a self-service terminal (SST) according to one embodiment of the present invention.

Reference is first made to FIG. 1, which is a pictorial front view of a self-service terminal (SST) 10 according to one embodiment of the present invention. In this embodiment, the SST 10 is a through-the-wall ATM.

The ATM 10 includes a customer interface comprising apertures (also called slots) aligning with devices within the ATM 10. These apertures include: a cash dispenser aperture 12, a coin dispenser aperture 14, a statement printer aperture 16, a receipt printer aperture 18, a card reader aperture 20, and a cash deposit aperture 22.

The ATM 10 also includes an encrypting keypad 30, a private audio socket 32, and a touch-sensitive display module 34.

Figure 2:
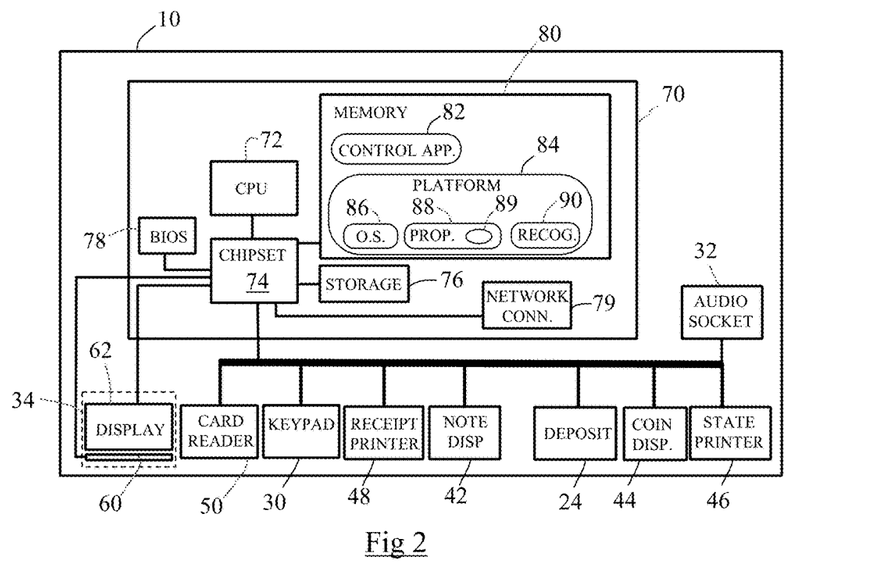
FIG. 2 is a simplified schematic diagram showing internal components of the SST of FIG. 1.

Reference will now also be made to FIG. 2, which is a simplified schematic diagram showing internal components of the ATM 10.

The ATM 10 includes user interface modules that align with the apertures shown in FIG. 1. These modules comprise: a cash dispenser 42, a coin dispenser 44, a statement printer 46, a receipt printer 48, a card reader 50, and a cash depository 52.

As illustrated in FIG. 2, the touch-sensitive display module 34 comprises a transparent touch-sensitive panel 60 overlying a display 62 and in registration therewith. The display 62 renders screens thereon to allow a customer to view transaction options.

As used herein, a "screen" refers to data (text, graphics) that is rendered on a display and instructions (control characters) for rendering that data. In other words, a screen is software; whereas, a display is hardware.

The ATM 10 further comprises a controller 70 for controlling the operation of the ATM 10, including the user interface modules that align with apertures (listed above) and the other user interface modules, such as the encrypting keypad 30, the private audio socket 32, and the touch-sensitive display module 34. These modules collectively will be referred to as the user interface modules.

The controller 70 comprises a central processing unit 72, a chipset 74 (including a memory interface, a graphics adapter, and an input/output interface), storage 76 (in the form of a disk drive), a BIOS 78, a network connection (in the form of an Ethernet card) 79, and memory 80.

The user interface modules are connected to the controller via the chipset 34. The display 62 is coupled via a graphics adapter (not shown) in the chipset 34, and the other modules (including the touch-sensitive panel 60) are connected via an I/O interface in the chipset 34.

The controller 70 executes two main software suites; each suite comprising a collection of software components.

The first software suite is a control application suite 82. The control application suite 82 comprises, inter alia, a transaction application (not shown) and a management application (not shown). The second software suite is a runtime platform 84. The runtime platform 84 comprises an operating system 86 (such as Windows (trade mark) XP, available from Microsoft Corporation), proprietary components (including drivers and supports files) 88 to control and operate the user interface modules, and a recognition engine 90 for operating on data receiving from the touch-sensitive panel 60.

The proprietary components 88 include a touch panel driver 89 that receives a signal from the touch-sensitive panel 60 each time that a user touches the panel 60, and creates a co-ordinate corresponding to the point touched. Where the user draws a stroke gesture on the touch-sensitive panel 60, the driver 89 creates a sequence of points (corresponding to the current contact position of the user's finger as it moves along the touch-sensitive panel 60) and conveys the sequence of points to the recognition engine 90.

The recognition engine 90 includes a character recognition engine based on the "Graffiti" engine, as described in U.S. Pat. No. 5,596,656 that converts the sequence of points to a character.

Figure 3:
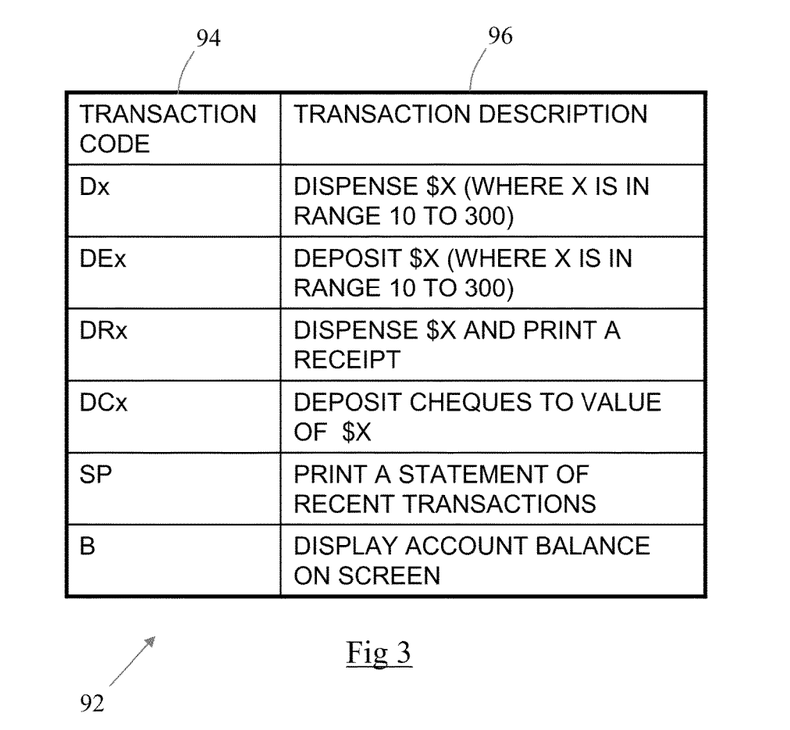
FIG. 3 is a table illustrating a plurality of transaction codes that can be delineated by a customer on a component (a display module) of the SST of FIG. 1, and transactions associated with those transaction codes.

As illustrated in FIG. 3, the recognition engine 90 also stores a transaction table 92. The first column 94 of transaction table 92 lists transaction strokes, that is, characters representing stroke gestures that a user may delineate on the touch-sensitive panel 60. The second column 96 of transaction table 92 lists transactions corresponding to the transaction strokes. Thus, if a user writes "D100" on the touch-sensitive panel 60 then the recognition engine 90 recognizes this as a request to withdraw $100 from the user's account. The second column 96 of transaction table 92 is provided to aid the reader in understanding the transaction strokes and may not be used in practical embodiments.

Figure 4:
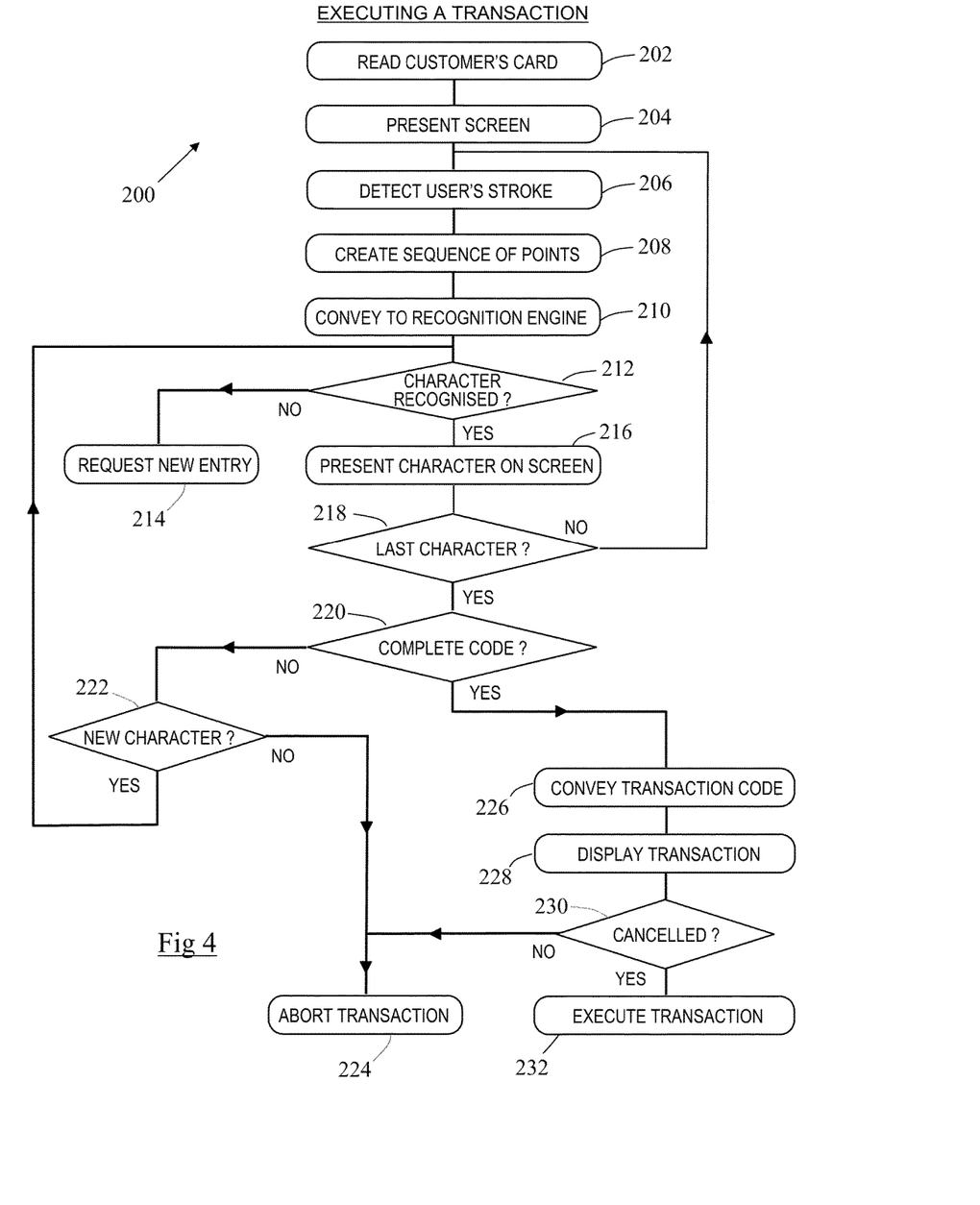
FIG. 4 is a flowchart illustrating the steps performed by the SST of FIG. 1 when a customer executes a transaction using stroke gestures.
Figure 5:
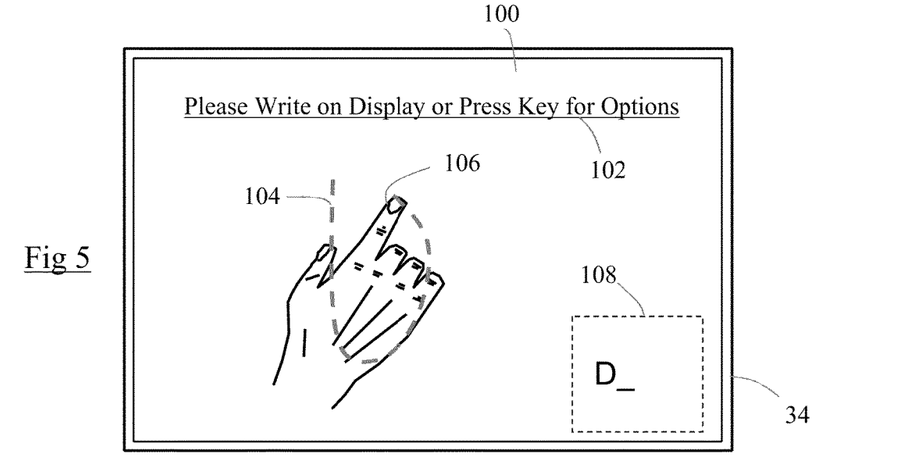
FIG. 5 is a pictorial drawing illustrating the display module of the SST of FIG. 1 being used by a customer to enter a first stroke gesture.
Figure 6:
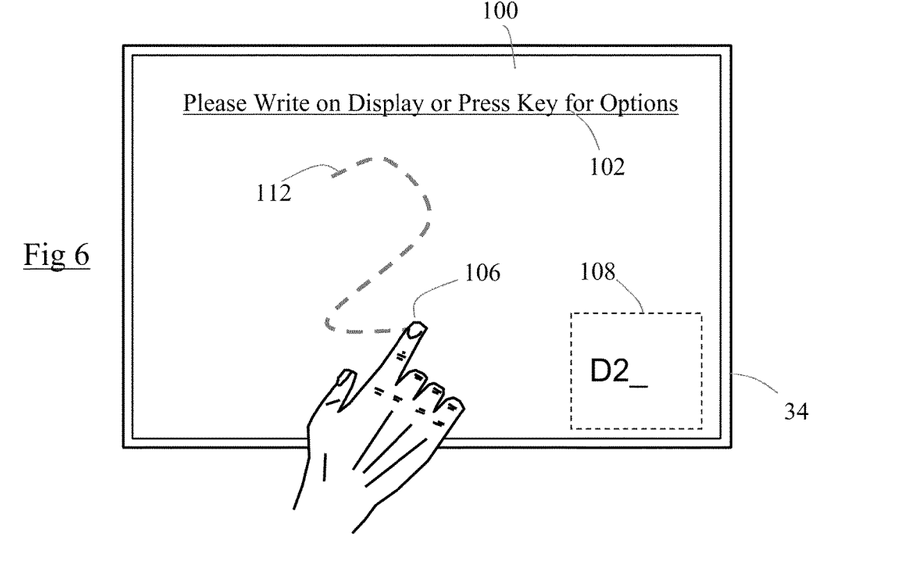
FIG. 6 is a pictorial drawing illustrating the display module of the SST of FIG. 1 being used by a customer to enter a second stroke gesture.
Figure 7:
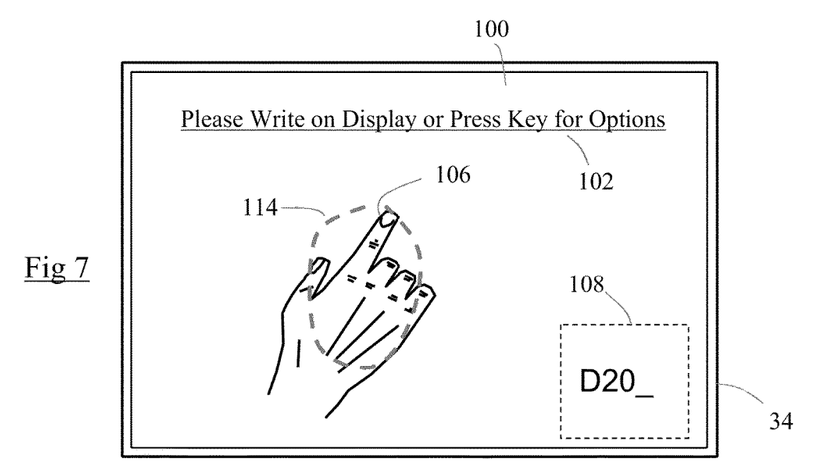
FIG. 7 is a pictorial drawing illustrating the display module of the SST of FIG. 1 being used by a customer to enter a third stroke gesture.
Figure 8:
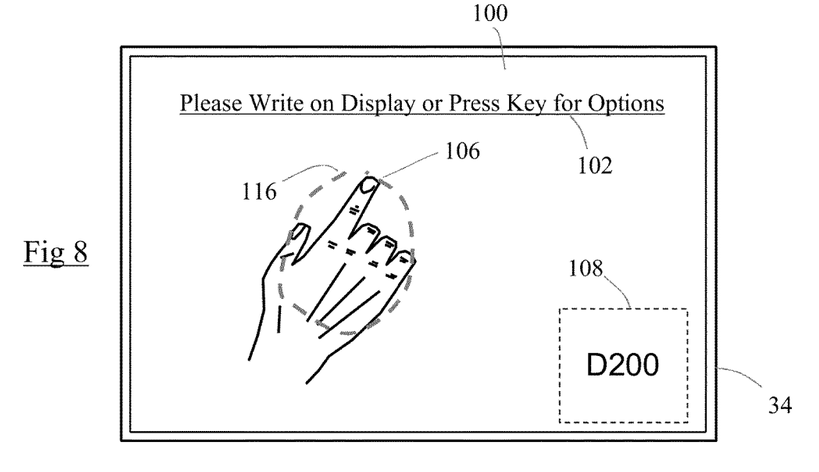
FIG. 8 is a pictorial drawing illustrating the display module of the SST of FIG. 1 being used by a customer to enter a fourth stroke gesture.

The operation of the ATM 10 when a customer executes a transaction using stroke gestures will now be described with reference to FIG. 4, which is a flowchart 200 illustrating the steps performed by the ATM 10. Reference will also be made to FIGS. 5 to 9, which are pictorial drawings illustrating the display module 34 being used by a customer at various stages in entering a transaction.

Initially, a customer walks up to the ATM 10 and inserts his/her card into the card reader aperture 20 to be read by the card reader module 50. The ATM 10 reads the customer's card (step 202) to ascertain account information.

The ATM 10 then presents a gesture screen 100 (step 204) having text 102 inviting the customer to write a transaction code on the display 62, or to press one of the keys on the keypad 30 to select a transaction option.

The customer decides what transaction he/she would like to execute. In this example, the customer would like to withdraw two hundred dollars. To initiate this transaction, the customer uses his/her finger to draw a "D" shape (illustrated by broken line 106 in FIG. 5) on the touch-sensitive panel 60 using a single stroke of his/her finger 108. The customer then writes the number "2" (illustrated by broken line 112 in FIG. 6) on the touch-sensitive panel 60, followed by the number "0" twice (illustrated by broken lines 114,116 in FIGS. 7 and 8 respectively).

The touch-sensitive panel 60 detects this sweeping movement for each gesture delineated by the customer (step 206). Each stroke gesture begins when the customer places his/her finger 106 on the touch-sensitive panel 60 and ends when the customer lifts his/her finger 106 off the touch-sensitive panel 60.

The touch panel driver 89 converts each stroke delineated by the user into a series of co-ordinates representing the points touched by the customer while making the stroke gesture (step 208), and conveys these co-ordinates to the recognition engine 90 (step 210).

The recognition engine 90 then attempts to recognize each stroke (step 212). If the recognition engine 90 does not recognize the entered stroke as written by the customer's finger 106, then the ATM 10 displays a screen (step 214)

inviting the customer either to re-enter the character or to press a key on the keypad 30 to select a transaction in a conventional manner.

If the recognition engine 90 succeeds in recognizing the stroke gesture as a character, then the ATM 10 displays this recognized character on a feedback region 108 (FIG. 5) of the gesture screen 100 (step 216).

The ATM 10 then ascertains if the recognized character is the last character that the customer will enter (step 218). Ascertaining if the recognized character is the last character can be implemented in different ways. In this embodiment, if a predetermined amount of time elapses, for example four seconds, before another character is written on the touch-sensitive panel 62, then the ATM 10 handles this as the last character.

If the recognized character is not the last character, then the ATM returns to step 206, where the customer's stroke gesture entry is detected.

If the recognized character is the last character, then the ATM ascertains if the transaction code is a complete code (step 220). This is implemented by the recognition engine 90 ascertaining if sufficient characters have been entered to match a transaction code in the transaction stroke list column 94 of transaction table 92, as illustrated in FIG. 3. However, in parallel with this, the touch panel driver 89 continues to detect any inputs (such as stroke gestures) at the touch-sensitive panel 60, to convert any stroke gestures delineated by the customer into a series of co-ordinates, and to convey these co-ordinates to the recognition engine 90.

If insufficient characters have been entered to match a transaction code in the transaction table 92, then the recognition engine 90 ascertains if another character has been input since entry of the character that was handled as the last character (step 222).

If another character has been input then the ATM 10 returns to step 212 to attempt to recognize the character.

If another character has not been input then the ATM 10 aborts the transaction and returns the card to the customer (step 224).

If sufficient characters have been entered to match a transaction code in the transaction table 92, then the recognition engine 90 conveys this transaction code (or another code indicative of the transaction associated with the transaction code) to the control application 82 (step 226).

Figure 9:
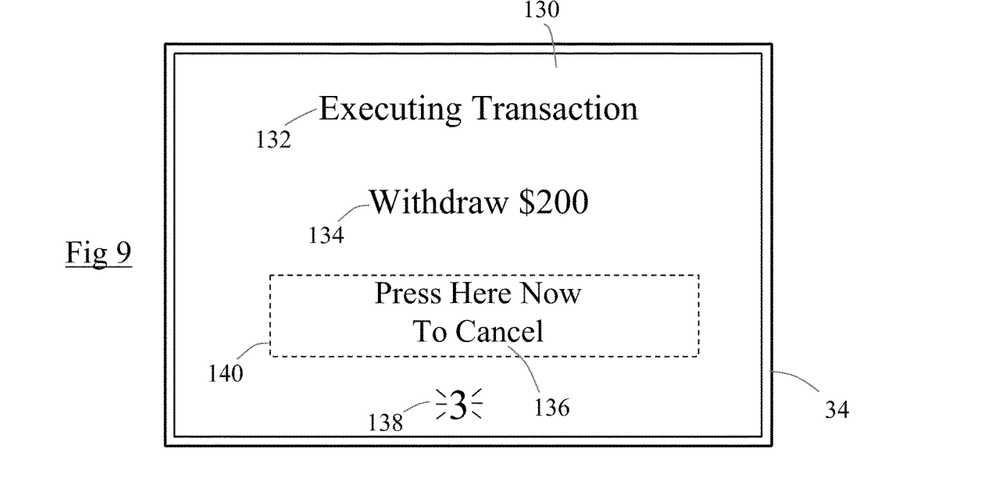
FIG. 9 is a pictorial drawing illustrating the display module of the SST of FIG. 1 presenting a screen informing the customer of a transaction about to be executed in response to the stroke gestures delineated by the customer, as shown in FIGS. 5 to 8.

As illustrated in FIG. 9, the control application 82 then presents a confirmation screen 130 to the customer indicating the transaction that has been selected by the customer (step 228).

The confirmation screen 130 includes a banner 132 indicating that the entered transaction is being executed, a transaction description 134 giving details of the transaction being executed, a cancel option 136, and a decrementing timer 138. The cancel option indicates to the customer the time remaining before the transaction will be executed. This allows the customer to cancel the transaction, for example, by pressing a cancel zone 140 on the confirmation screen 130 before the decrementing timer 138 reaches zero. While the confirmation screen 130 is being displayed, the ATM 10 obtains authorization for the desired transaction and pre-stages the requested banknotes (two hundred dollars in this example) so that the transaction can be executed immediately after the decrementing timer 138 reaches zero without any further delay.

ATM 10 ascertains if the customer has decided to cancel the transaction (step 230).

If the customer decides to cancel the transaction, for example, by pressing the cancel zone 140, then the ATM aborts the transaction and returns the card to the customer (step 224).

If the decrementing timer reaches zero without the customer cancelling the transaction, then the ATM 10 executes the transaction (step 232) by dispensing the requested amount (two hundred dollars) to the customer.

It should now be appreciated that this embodiment has the advantage that a customer can execute an entire transaction merely by writing a letter and a few numbers on the touch-sensitive panel 60. No further customer entry is required. This improves usability and may decrease the time taken to execute a transaction.

Various modifications may be made to the above described embodiment within the scope of the invention, for example, in other embodiments, an SST other than an ATM may be used.

In other embodiments, the customer may only enter a number using a stroke gesture, and the SST may conclude that this number relates to an amount of cash requested. For example, the customer may enter the number eight then the number zero using two stroke gestures. The ATM 10 may then present a screen or provide an audible response via the private audio socket 32 (or through a loudspeaker) asking the customer to confirm that he/she wants to withdraw eighty dollars. If the customer confirms, for example by pressing a confirmation area on the screen (or tapping the touch-sensitive panel 60 twice for "yes") then the ATM executes the transaction. If the customer indicates that this is not correct (for example, tapping the touch-sensitive panel 60 once for "no"), then the ATM may present a screen or provide an audible response via the private audio socket 32 asking the customer to confirm that he/she wants to deposit eighty dollars.

In other embodiments, the SST may learn what transactions a customer typically requests, and may prompt the customer with further options once the customer has completed one or more stroke gestures. For example, if the customer enters the letter "B" for balance, the SST may offer the customer two options, (i) print a mini-statement with the customer's balance (which may correspond to the stroke gesture "BP"), or (ii) display the current balance on a screen on the SST (which may correspond to the stroke gesture "BD").

In other embodiments, ascertaining if the recognized character is the last character may be implemented in a different way. For example, the ATM may provide a visual and/or audible countdown of the time remaining for the customer to delineate another character on the touch-sensitive panel. Alternatively, the customer may delineate a "last character" stroke, such as a horizontal line, to indicate that the gesture input is complete.

In other embodiments, the length of times used may differ from those described above.

In other embodiments, a customer may have to confirm that the transaction is correct prior to execution of the transaction.

In other embodiments, test transactions may be offered to service personnel, such as receipt printing transactions.

In other embodiments, a display may be provided having an imager that views stroke gestures delineated on the display and performs optical character recognition on those delineated stroke gestures.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of executing a transaction for a user at a self-service terminal, the transaction is directed from user-supplied gestures, the method implemented as executable instructions residing in a non-transitory computer-readable storage medium, the instructions executed from the non-transitory computer-readable storage medium on one or more processors of the self-service terminal (SST), the method comprising:
   (a) sensing, by the SST, a stroke gesture delineated by a sweeping movement of a finger of the user making contact on a touch-sensitive panel of a hardware display integrated into the SST, the stroke gesture ending when the finger is lifted off the touch-sensitive panel with no additional movement of the user making contact on the touch-sensitive panel for a predefined amount of time;
   (b) recognizing, by the SST, the delineated stroke gesture by a stroke recognition engine;
   (c) matching, by the SST, the delineated stroke gesture to one of a plurality of defined transaction strokes by the SST, each defined transaction stroke being associated with a specific transaction performed by the SST and identifying with the delineated stroke gesture a transaction amount written on the touch-sensitive panel within the predefined period of time after the delineated stoke gesture and matched to a user-defined transaction amount for processing with the specific transaction, wherein the delineated stroke gesture includes one or more user-written characters written by the user within a portion of the touch-sensitive panel as the specific transaction and the transaction amount overlies the specific transaction and is written within the portion on the touch-sensitive panel after the one or more user-written characters; and
   (d) executing, by the SST, the specific transaction associated with the matched transaction stroke by a transaction execution component with the user-defined transaction amount, and thereby enabling the SST to execute the specific transaction from the user-supplied delineated stroke gesture written by the user on the touch-sensitive panel without the user having to navigate through a sequence of information gathering screens presented on the SST to perform the specific transaction.

2. A method according to claim 1, wherein the method comprises the further steps of:
   (c+1) informing the user of the specific transaction associated with the matched transaction stroke;
   (c+2) requesting the user to confirm that the specific transaction associated with the matched transaction stroke is the transaction that the user would like to execute;
   (c+3) executing step (d) only in response to detecting the user's confirmation that the specific transaction associated with the matched transaction stroke is the transaction that the user would like to execute.

3. A method according to claim 1, wherein the method comprises the further steps of:
   (c+1) informing the user of the specific transaction associated with the matched transaction stroke;
   (c+2) informing the user that the specific transaction associated with the matched transaction stroke will be executed within a defined time period unless the user cancels the transaction;
   (c+3) executing step (d) when the defined time period elapses without the user cancelling the transaction.

4. A method according to claim 3, wherein the defined time period comprises a defined unit of time.

5. A method according to claim 3, wherein the defined time period comprises how long it takes the terminal to pre-stage the specific transaction associated with the matched transaction stroke.

6. A method according to claim 1, wherein the step of sensing a stroke gesture delineated by the user on a touch-sensitive panel includes converting the sensed stroke gesture to a sequence of points.

7. A method according to claim 6, wherein the step of recognizing the delineated stroke gesture includes the sub-step of converting the sequence of points to one or more characters.

8. A method according to claim 7, wherein the step of matching the delineated stroke gesture to one of a plurality of defined transaction strokes includes matching the one or more characters from the converted sequence of points to one or more characters in a list of transaction character entries, each transaction character entry in the list being (i) unique, and (ii) associated with a predefined transaction.

9. A method according to claim 1, wherein the stroke gesture comprises a character drawn on the touch-sensitive panel.

10. A method according to claim 1, wherein the stroke gesture begins when the customer places a finger on the touch-sensitive panel and ends when the customer lifts the finger off the touch-sensitive panel.

11. A method according to claim 10, further comprising:
    employing optical character recognition to recognize the delineated stroke gesture as a character.

12. A method according to claim 1 further comprising:
    displaying the delineated stroke gesture on a feedback region of the touch-sensitive panel.

13. A method according to claim 1 wherein the delineated stroke gesture is associated with a dispensing transaction, and the method further comprises:
    sensing at least a second stroke gesture;
    recognizing the second stroke gesture; and
    matching said at least second stroke gesture with a dollar amount.

14. A non-transitory computer readable storage medium storing a computer program for processing a transaction that is derived from user-supplied gestures, and the computer program stored in a non-transitory computer-readable medium comprising instructions that, when executed on a processor a self-service terminal (SST), performs the following steps:
    executing, by the processor of the SST, the computer program from the non-transitory computer readable medium, the SST performing processing for:
    (a) sensing, by the SST, a stroke gesture delineated by a sweeping movement of a finger of the user making contact on a touch-sensitive panel of a hardware display of the SST, the stroke gesture ends when the finger is lifted off the touch-sensitive panel with no additional movement of the user making contact on the touch-sensitive panel for a predefined amount of time;

(b) recognizing, by the SST, the delineated stroke gesture by a stroke recognition engine;

(c) matching, by the SST, the delineated stroke gesture to one of a plurality of defined transaction strokes by the SST, each defined transaction stroke being associated with a specific transaction performed by the SST and identifying with the delineated stroke gesture a transaction amount written on the touch-sensitive panel within the predefined period of time after the delineated stoke gesture and matched to a user-defined transaction amount for processing with the specific transaction, wherein the delineated stroke gesture includes one or more user-written characters written by the user within a portion of the touch-sensitive panel as the specific transaction and the transaction amount overlies the specific transaction and is written within the portion on the touch-sensitive panel after the one or more user-written characters; and (d) executing the specific transaction associated with the matched transaction stroke by a transaction execution component with the user-defined transaction amount, and thereby enabling the SST to process the specific transaction from the user-supplied delineated stroke gesture written by the user on the touch-sensitive panel without the user having to navigate through a sequence of information gathering screens presented on the SST to perform the specific transaction.

15. A self-service terminal (SST) for processing user-supplied gesture transactions, the SST comprising:

a touch-sensitive panel of a hardware display for the SST, the touch-sensitive panel configured to detect a sweeping movement of a finger of a user making contact on the panel as the user delineates a stroke gesture on the panel, the stroke ends when the finger is lifted off the touch-sensitive panel with no additional movement of the user making contact on the touch-sensitive panel for a predefined amount of time;

a stroke recognition engine configured to execute on a processor of the SST and further configured to
(i) convert a sequence of points received from the touch-sensitive panel and corresponding to each stroke gesture delineated by the user to a character,
(ii) match the converted characters to one of a plurality of transaction entries, each transaction entry being (a) unique, and (b) associated with a predefined transaction, and
(iii) identify a specific transaction associated with the matched transaction entry and identify with the delineated stroke gesture a transaction amount written on the touch-sensitive panel within the predefined period of time after the delineated stoke gesture and matched to a user-defined transaction amount for processing with the specific transaction, wherein the delineated stroke gesture includes one or more user-written characters written by the user within a portion of the touch-sensitive panel as the specific transaction and the specific transaction overlies the transaction amount and is written within the portion on the touch-sensitive panel after the one or more user-written characters; and a transaction execution component arranged to execute the specific transaction with the user-defined transaction amount and thereby enable the SST to execute the specific transaction from the user-supplied stroke gestures written on the touch-sensitive panel by the user without the user having to navigate through a sequence of information gathering screens presented on the SST to perform the specific transaction.

16. A terminal according to claim 15, wherein the transaction execution component comprises a transaction application program executing on a controller in the SST.

17. A terminal according to claim 15, wherein the stroke recognition engine stores a table of transactions and corresponding characters identifying those transactions.

18. A terminal according to claim 15, wherein the SST further comprises a token reader to identify the user.

19. A terminal according to claim 15, wherein the SST includes a banknote dispenser.

* * * * *